United States Patent [19]

Rolfson

[11] 3,764,015
[45] Oct. 9, 1973

[54] APPARATUS FOR CONFINING FLOATING POLLUTANTS

[76] Inventor: Emmet H. Rolfson, R.R. 3, Estherville, Iowa

[22] Filed: May 3, 1972

[21] Appl. No.: 250,062

[52] U.S. Cl. ............ 210/242, 61/1 F, 210/DIG. 21
[51] Int. Cl. ............................................ E02b 15/04
[58] Field of Search............... 210/83, 242, DIG. 21; 61/1 F

[56] References Cited
UNITED STATES PATENTS

| | | | |
|---|---|---|---|
| 3,578,171 | 5/1971 | Usher | 210/242 |
| 3,592,008 | 7/1971 | Trindle | 61/1 F |
| 3,628,665 | 12/1971 | Bakker | 210/242 |
| 3,650,406 | 3/1972 | Brown et al. | 210/242 |
| 3,369,664 | 2/1968 | Dahan | 210/83 |
| 3,688,506 | 9/1972 | Marcocchio | 210/242 |
| 3,686,870 | 8/1972 | Blomberg | 61/1 F |
| 3,701,259 | 10/1972 | Heartness | 61/1 F |
| 3,563,036 | 2/1971 | Smith et al. | 61/1 F |
| 3,608,316 | 9/1971 | Manuel | 61/1 F |

Primary Examiner—Samih N. Zaharna
Assistant Examiner—T. A. Granger
Attorney—Robert U. Geib, Jr.

[57] ABSTRACT

A sizeable number of substantially rectangular buoyant lightweight and fireproof platforms are provided which are connected in series and adapted to be towed to the site while flat, made to surround the area from which the pollutants are to be removed, and then rotated approximately 180° on their axes to assume a substantially vertical position. While in vertical position these substantially rectangular platforms are adjustable as to the depth to which they extend. After the pollutants have been removed to a satisfactory extent, the substantially rectangular platforms are rotated on their longitudinal axes to assume their initial flat position, and then towed away while still serially connected as before. Means for effecting the aforementioned rotational movement of each of the substantially rectangular platforms is provided by one or more elongated tanks which extend transversely of the platforms, and which are divided by an airtight partition into an airtight flotation compartment and an airtight ballast compartment, together with means for adjusting the quantity of water in each of the ballast tanks; also for adjusting the depth to which the platforms extend into the water when in their vertical positions.

3 Claims, 8 Drawing Figures

APPARATUS FOR CONFINING FLOATING POLLUTANTS

Regardless of the manner in which they are caused, floating pollutants and especially slicks of oil or other petroleum products on waterways, have created very serious problems for many years. In more recent years, the vast increase in offshore oil wells has greatly increased the incidence of oil slicks and the objectionable characteristics thereof. In some instances, slicks are formed of highly flammable petroleum products, such as gasoline and serious fire hazards are created.

It is among the objects of the present invention to provide a very efficient apparatus for removing undesirable substances from the surface of a body of water; whether said substance be aflame or otherwise.

Another object is the attainment of the foregoing in a manner which is simple and inexpensive, requiring equipment which is relatively inexpensive to manufacture, operate and maintain.

The foregoing and other objects will become more readily understood after referring to the following description and annexed drawings wherein like reference characters designate like parts, and wherein.

Figure 1:
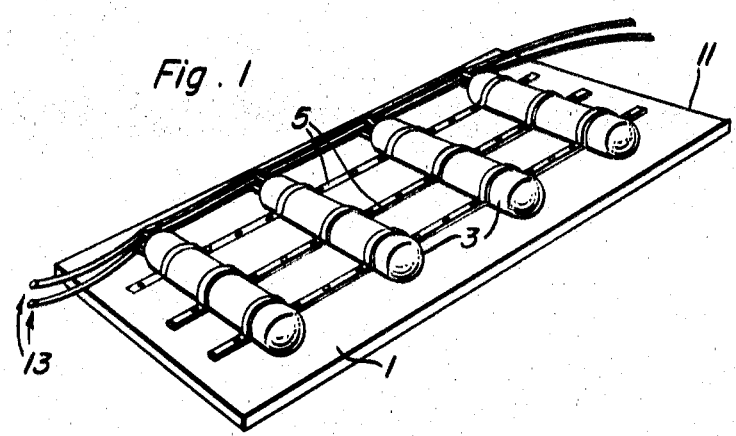
FIG. 1 is an isometric view illustrating one of the lightweight buoyant platforms of the apparatus of the invention.
Figure 2:
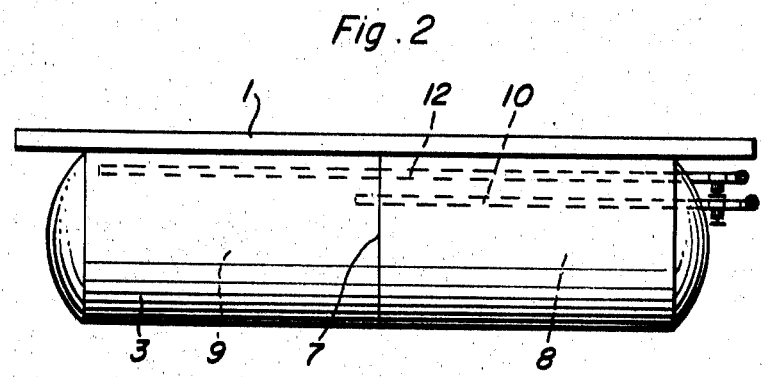
FIG. 2 is an end view of the lightweight buoyant platform of FIG. 1.

Referring more particularly to the drawings, the numeral 1 designates a lightweight, substantially flat, fireproof platform which is relatively thin and rectangular in plan; and disposed on one side of said platform in a series of transversely extending evenly spaced pressure tanks 3 which are secured in position by any suitable means, such as a series of transversely extending straps 5. A series of such pressure tanks 3 may, as shown in the drawings, comprise four in number.

The straps 5 which are shown in spaced relationship may be attached by any suitable means to the adjacent side of the lightweight, substantially flat, platform while they are in longitudinal parallelism.

It will be understood that the invention contemplates the use of a sizeable number of such lightweight, substantially flat, rectangular fireproof platforms, each with its own series of transversely extending evenly spaced pressure tanks 3, and since they may be of identical construction but one of them will, for purposes of disclosure, be specifically described immediately hereinafter.

Each of the pressure tanks 3 on the lightweight, substantially flat, rectangular platform 1 is provided with an intermediately disposed interior partition 7.

Figure 3:
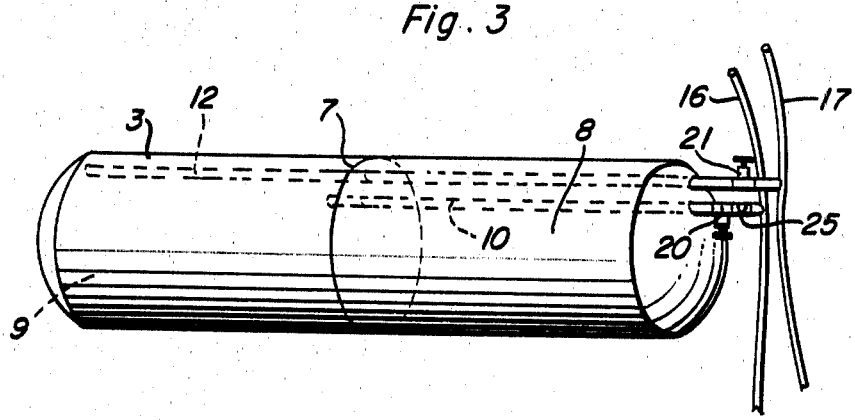
FIG. 3 is an elevational view illustrating in greater detail one of the pressure tanks which are carried by the lightweight buoyant platforms.

As viewed in FIG. 3, the upper portion of the interior of the pressure tank 3, as established by the interior partition 7 is air-sealed and provides a flotation compartment 8 which establishes buoyancy for the tank (3) to float; and the lower portion of the interior of the pressure tank 3 is likewise air-sealed and provides a ballast compartment 9.

As shown most clearly in FIG. 3, two tubes 10 and 12 extend downwardly from the top of each of the pressure tanks 3 and communicate with the ballast compartment 9 thereof. The shorter of these two tubes i.e., the tube 10 terminates just below the transverse partition 7 at the mid-section of the pressure tank, and serves to supply air to the ballast compartment 9 while the longer one (12) terminates adjacent to, but slightly above, the bottom of the pressure tank; and serves to supply water to the ballast compartment (9). The flotation compartment 8 contains air and is air-sealed from the ballast compartment 9.

The air supply tube 10 and the water supply conduit 12 extend through, and project from, the top of the pressure tank 3 and are respectively connected to an air supply conduit 16 and a water supply conduit 17.

Figure 4:
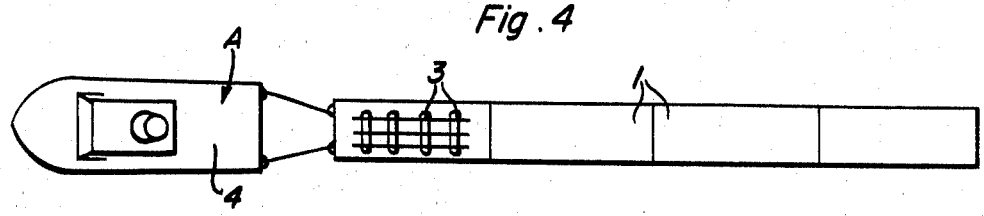
FIG. 4 is a schematic view illustrating a series of the lightweight buoyant platforms being towed by a tug or other marine vessel.
Figure 5:
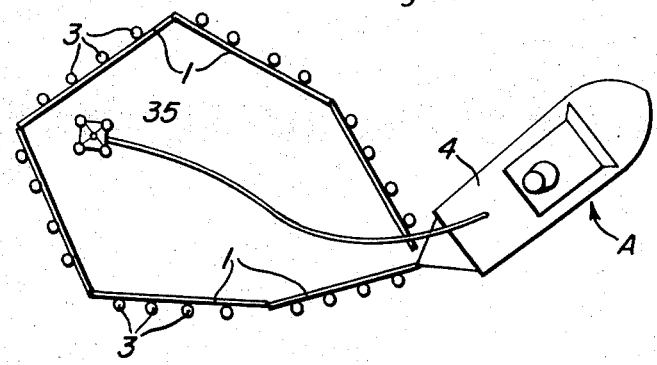
FIG. 5 is a view which is similar in nature to that of FIG. 4, but illustrating the tug as having towed a series of lightweight buoyant platforms into such position as to form a "pen" which circumscribes or delineates the area of the slick to be removed.

The opposite ends of the air supply conduit 16 and the water supply conduit 17 extend to a tug or other operating vessel which, in FIGS. 4 and 5 is generally indicated at A.

Installed in the air supply tube 10, adjacent the upper end thereof, is a manual pet-cock valve 20, and a similar pet-cock valve 21 is similarly installed in the water supply tube 12.

In addition, a ball-check valve 25 is installed in the air supply tube 10 immediately above the pet-cock valve 20, the purpose of which is to restrict the flow in the air supply tube 10 to one direction i.e., into the ballast compartment 9 of the pressure tank; and it closes to prevent any water in the ballast compartment from flowing into the air supply tube.

Suitable pumping equipment (not shown) is carried by the tug or other operating vessel for supplying the air supply tube 10 and the water supply tube 12 with air and water, respectively.

If the same are deemed desirable, counter-weights (not shown) may be utilized to assure the best weight distribution in the water for the pressure tank 3 (and the buoyant lightweight platform 1 carrying the same) to assume a more or less true vertical position.

Figure 8:
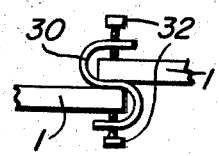
FIG. 8 is an elevational view illustrating one of the details of the apparatus.

As stated earlier herein, in FIGS. 4 and 5 a series of buoyant lightweight platforms 1 (with their respective series or pluralities of transversely extending pressure tanks 3) are connected in tandem or close juxtaposition. For this purpose, there may be employed an intermediately disposed S-shaped coupling as shown at 30 in FIG. 8, the same being provided with clamping screws 32 which engage the buoyant platforms 1 closely adjacent their corresponding ends.

Such a connection between the successive buoyant platforms will permit sufficient flexibility to permit them to be towed into a circle or other conformation and thus surround the oil slick or other fluid body to be removed; and the very close proximity of the adjacent ends of the platforms permit the formation of a substantially watertight pen.

When the tug or other operating vessel A is proceeding to the spill, the pressure tanks 3 are filled with air and they will therefore assume a horizontal position in the water, as indicated in FIG. 4.

If sufficient towing speed is provided the buoyant platforms 1 will plane on the water and thus expedite arrival at the desired location.

Once at the scene of the spill the operator of the towing vessel A opens the pet-cock valve 21 on the air supply tube 10 of each of the pressure tanks 3 on each of the buoyant platforms 1, to thus fill the ballast compartments 9 of said tanks with water; this being done in intervals the full length of the series of buoyant platforms 1. Thus weighted, the platforms will assume a vertical position in the waterway, and the towing vessel A, maneuvering in a circle can completely surround or enclose the spill so that pumping can begin.

Once the spill or other undesirable substance on the water is enclosed or surrounded the towing vessel A may, if desired, be disconnected.

Since the operator can control the ballast in the ballast compartment of the buoyant lightweight platforms 1, they can be raised or lowered in the water to correspond to the depth of the spill.

Figure 6:
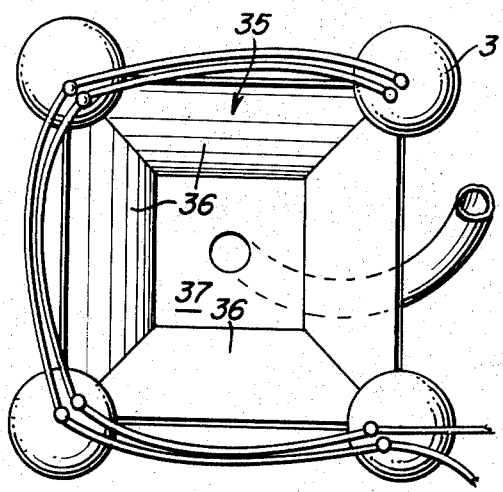
FIG. 6 is a plan view of a skimming device which may be employed to remove the penned-in slick on the waterway.
Figure 7:
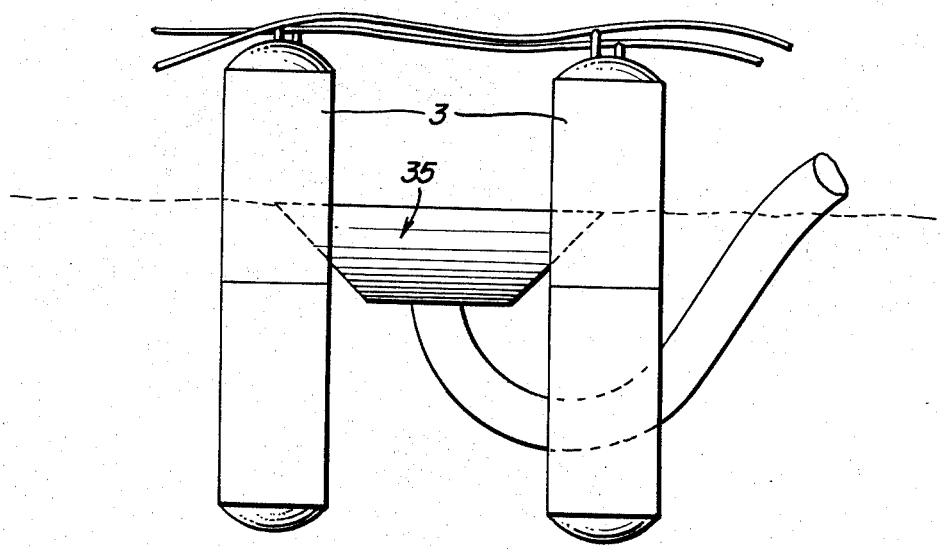
FIG. 7 is an elevational view of the apparatus of FIG. 6.

Referring now to FIGS. 6 and 7, there is provided a skimming basin 35 which is shown as being substantially square in plan and provided with downwardly sloping or converging sides 36 which connect with a bottom 37 of much smaller area. The bottom 37 is provided with an opening which communicates with a suction hose which leads to suction pump (not shown) on the operating vessel 4; from whence it is pumped to a reservoir outside of the pen formed by the series of juxtaposed buoyant platforms 1 and associated equipment, or to any other suitable site for disposal.

It will be understood that the skimming basin 35 is carried by a series of pressure tanks 3 (shown as being four in number and disposed at the corners of the skimming basin) which are identical in construction with, and operate in the same manner as, the pressure tanks 3 described earlier herein. In these views the pet-cock valves 20 and 21 have been omitted in the interests of simplification.

Having thus described the invention what I claim as new and desire to secure by Letters Patent is:

1. Apparatus for confining floating pollutants comprising, in combination
   a plurality of individual substantially rectangular buoyant and relatively flat platforms which are connected together and adapted to float flatwise and be moved in tandem into position surrounding the fluid body to be removed;
   at least one transversely disposed elongated pressure tank attached to and carried by each of said individual buoyant platforms;
   each of said pressure tanks being transversely partitioned and providing an air-sealed flotation compartment on one side and an air-sealed ballast compartment on the other;
   means for supplying the ballast compartment of each of said pressure tanks with sufficient water to cause the buoyant platform by which it is carried to move into substantially vertical position;
   whereby the plurality of such platforms may surround the area of the floating pollutants while in said position;
   means for adjusting the quantity of water in each of said ballast compartments to thereby raise or lower the buoyant platforms according to the depth of the floating pollutants; and
   removing the water from the ballast compartments of the pressure tanks on the buoyant platforms until the latter again assume substantially horizontal position.

2. The apparatus of claim 1 wherein said water supplying means, said water adjusting means, and said water removing means comprise a pair of conduits which pass through said flotation compartment and said transverse partition and communicate with the interior of said ballast compartment.

3. The apparatus of claim 1, together with a pollutant skimming basin and a plurality of pressure tanks of the type described disposed vertically and secured to the edges of said skimming basin at appropriately spaced positions with respect thereto, whereby said basin may also be raised or lowered with respect to the depth of the area of the floating pollutants.

* * * * *